United States Patent
Moreno

(10) Patent No.: US 12,037,971 B1
(45) Date of Patent: Jul. 16, 2024

(54) WAVE POWERED HYDRAULIC PISTON GENERATOR ASSEMBLY

(71) Applicant: Rene Moreno, Atwater, CA (US)

(72) Inventor: Rene Moreno, Atwater, CA (US)

( * ) Notice: Subject to any disclaimer, the term of this patent is extended or adjusted under 35 U.S.C. 154(b) by 18 days.

(21) Appl. No.: 18/086,793

(22) Filed: Dec. 22, 2022

(51) Int. Cl.
*F03B 13/18* (2006.01)
*F15B 1/04* (2006.01)
*F15B 1/26* (2006.01)
*H02K 7/18* (2006.01)

(52) U.S. Cl.
CPC ............ *F03B 13/1845* (2013.01); *F15B 1/04* (2013.01); *F15B 1/26* (2013.01); *H02K 7/1823* (2013.01)

(58) Field of Classification Search
CPC .......... F03B 13/1845; F15B 1/04; F15B 1/26; H02K 7/1823
USPC ........................................ 290/42, 43, 53, 54
See application file for complete search history.

(56) References Cited

U.S. PATENT DOCUMENTS

| | | | |
|---|---|---|---|
| 2,715,366 | A | 8/1955 | Vartiainen |
| 5,084,630 | A | 1/1992 | Azimi |
| 6,695,536 | B2 | 2/2004 | Sanchez Gomez |
| 7,242,106 | B2 | 7/2007 | Kelly |
| 7,352,073 | B2 | 4/2008 | Ames |
| D618,170 | S | 6/2010 | Miller |
| 10,927,807 | B1 | 2/2021 | Bidgood |

FOREIGN PATENT DOCUMENTS

WO WO2012080749 6/2012

*Primary Examiner* — Charles Reid, Jr.

(57) ABSTRACT

A wave powered hydraulic piston generator assembly for powering a generator by a hydraulic turbine and piston assembly includes a container being positioned adjacent to the shoreline of a body of water. The container has an opening having an interior surface where a piston is positioned against. A rod protrudes out from a back surface of the piston wherein an end of the rod has a first seal being moving within a cylinder. The cylinder has an inlet positioned proximate to the first end of the cylinder, whereas an outlet is positioned on a second end of the cylinder. A first conduit of a tank is connected with the outlet of the cylinder. A turbine is connected with a second conduit of the tank. The turbine has a drive shaft in mechanical communication with a generator. Furthermore, the turbine is in fluid communication with the inlet of the cylinder.

15 Claims, 10 Drawing Sheets

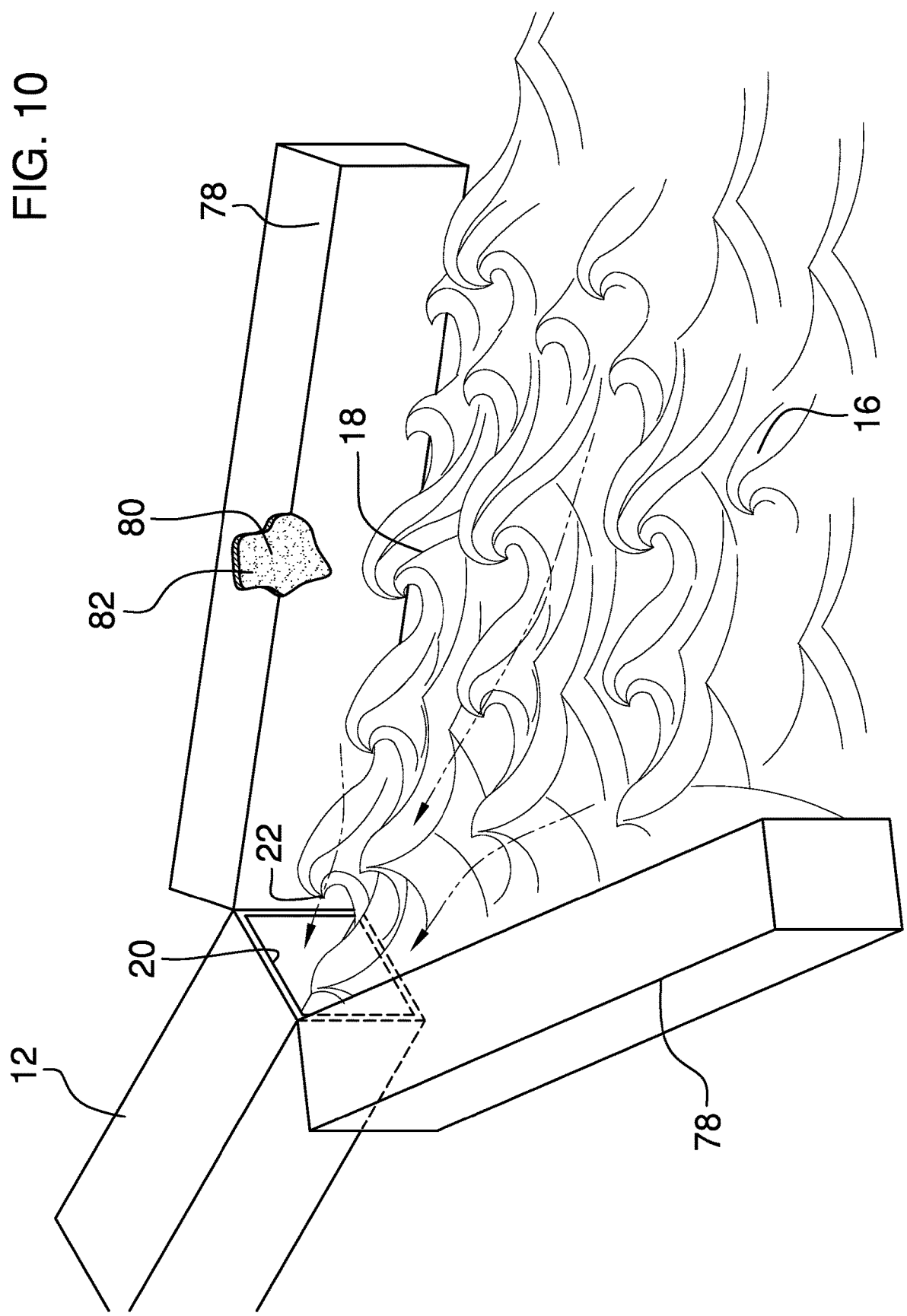

WAVE POWERED HYDRAULIC PISTON GENERATOR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

The Names of the Parties to a Joint Research Agreement

Not Applicable

Incorporation-by-Reference of Material Submitted on a Compact Disc or as a Text File Via the Office Electronic Filing System Not Applicable

Statement Regarding Prior Disclosures by the Inventor or Joint Inventor

Not Applicable

BACKGROUND OF THE INVENTION

(1) Field of the Invention

The disclosure relates to wave powered generator device and more particularly pertains to a new wave powered generator device for powering a generator by a hydraulic turbine and piston assembly.

(2) Description of Related Art Including Information Disclosed Under 37 CFR 1.97 and 1.98

The prior art relates to wave powered generator devices. The prior art includes a variety of wave powered generator devices configured for utilizing the power of a wave from a body of water to generate power. Known prior art lacks a wave powered generator device configured for being positioned adjacent to the body of water and having a hydraulic turbine in communication with a piston to utilized hydraulic fluid pressure to generate power.

BRIEF SUMMARY OF THE INVENTION

An embodiment of the disclosure meets the needs presented above by generally comprising a container. The container is positioned adjacent to the shoreline of a body of water. The body of water is configured for producing a wave. The container has an opening including an interior surface and an exterior surface. A piston is positioned against the interior surface of the container. The piston has a front surface and a back surface, wherein a rod protrudes out from the back surface of the piston. A cylinder is positioned within the container. An end of the rod has a first seal being configured for moving within the cylinder and retaining the rod within the cylinder. The cylinder has an inlet positioned proximate to the first end of the cylinder, whereas an outlet is positioned on a second end of the cylinder. A tank is in fluid communication with the outlet of the cylinder. The tank has a first conduit and a second conduit wherein the first conduit of the tank is in fluid communication with the outlet of the cylinder. A turbine is in fluid communication with the second conduit of the tank. The turbine has a drive shaft in mechanical communication with a generator. Furthermore, the turbine is in fluid communication with the inlet of the cylinder. A pair of barricades is positioned adjacent to the container wherein each of the barricades is configured for directing the wave of the body of water towards the opening of the container.

Furthermore, a method for generating power from a hydraulic piston assembly includes the step of placing a container adjacent to the shoreline of a body of water. The container is configured for being positioned at a downward angle relative to the body of water. An opening of the container faces the shoreline and a plurality of spikes of the container is inserted into the ground wherein retaining the container in place relative to the shoreline. The container absorbs a wing of a wave from the body of water within the opening of the container. The assembly further includes the step of retracting a piston within the container wherein thrusting a first seal of a rod of the piston within a cylinder. The first seal of the cylinder creates a hydraulic fluid pressure within the cylinder. The assembly flows the hydraulic fluid to a tank being configured for storing the hydraulic fluid. The assembly forces the hydraulic fluid out for the tank into a turbine. The turbine has a drive shaft engaging with a generator wherein the generator produces electric power. Subsequently, the turbine returns the hydraulic fluid to the cylinder. A gravitational weight of the piston reinstates the piston to an original position. The assembly repeats the prior steps to accumulate an abundance of electrical power from the generator. The user removes the container from the shoreline when use is complete.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 10 is an alternative view of an embodiment of the disclosure.

DETAILED DESCRIPTION OF THE INVENTION

Figure 1:
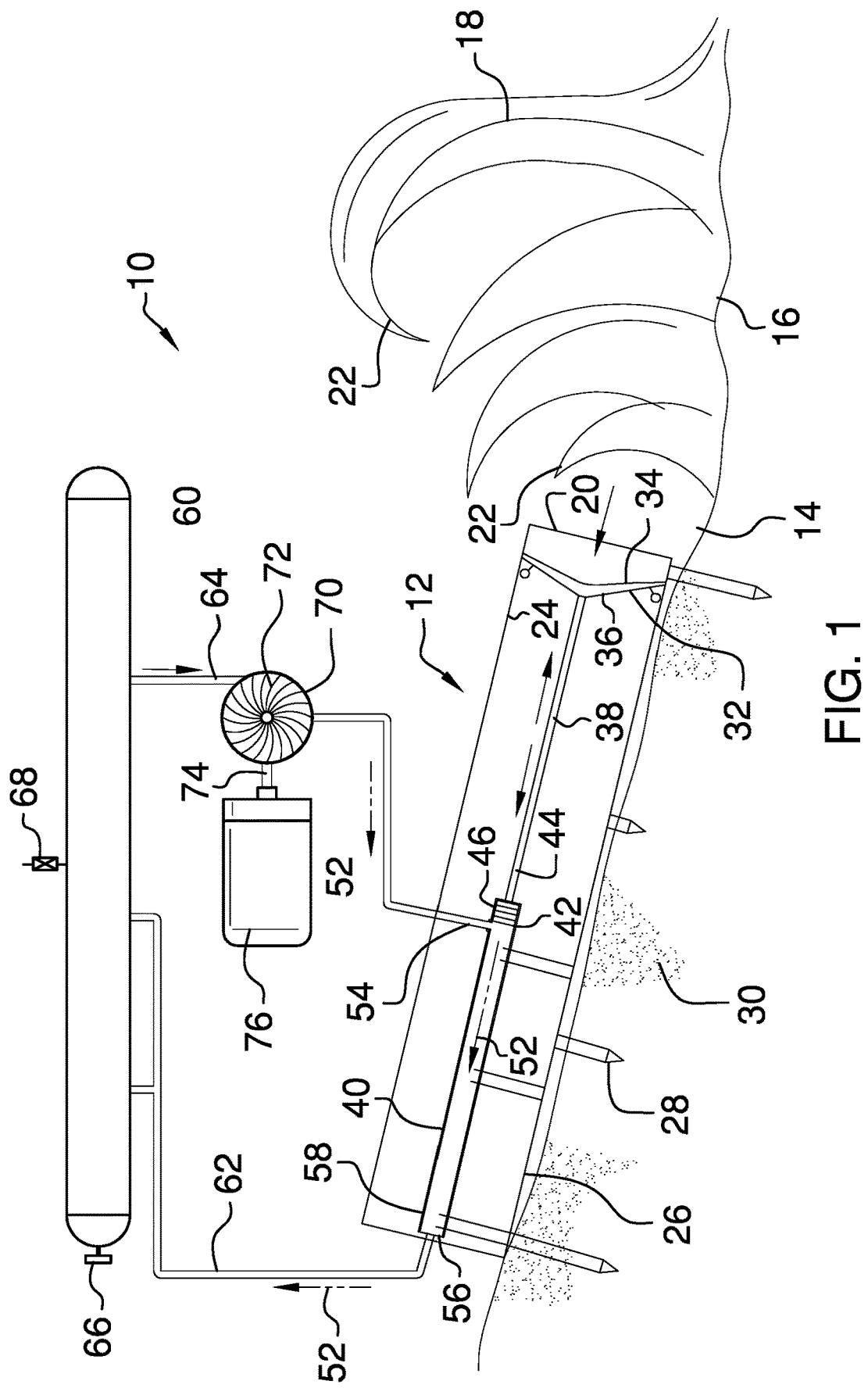
FIG. 1 is a front in-use view of a wave powered hydraulic piston generator assembly according to an embodiment of the disclosure.
Figure 2:
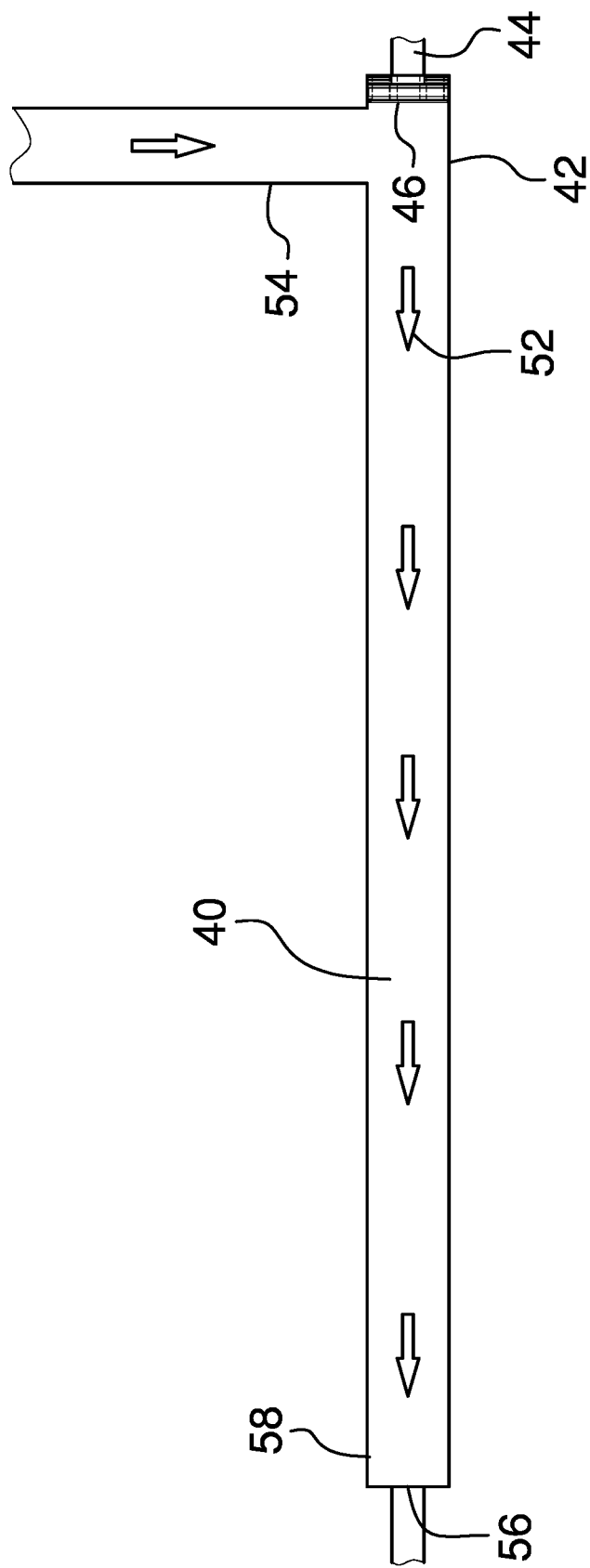
FIG. 2 is a detail view of an embodiment of the disclosure.
Figure 3:
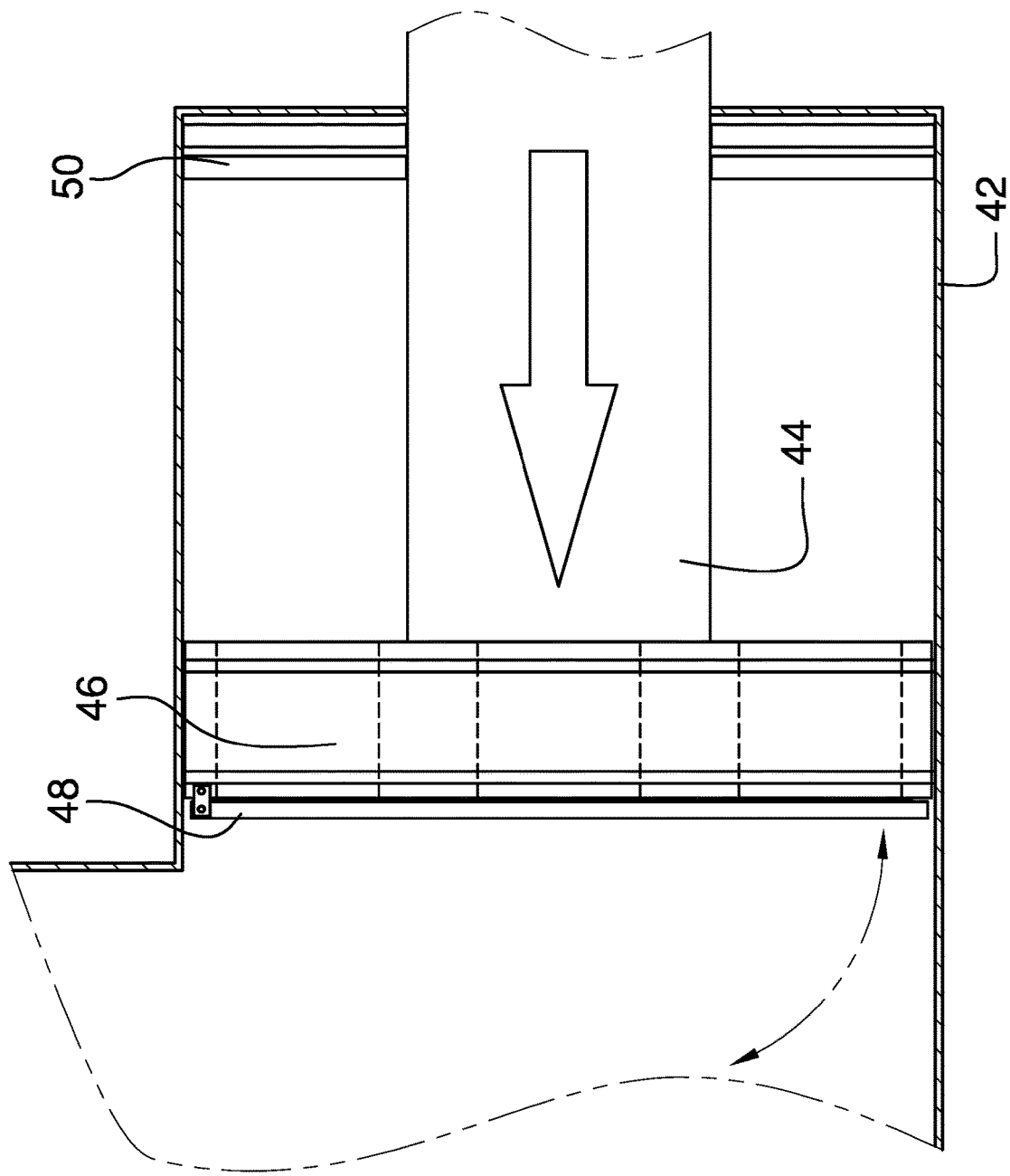
FIG. 3 is a detail view of an embodiment of the disclosure.
Figure 4:
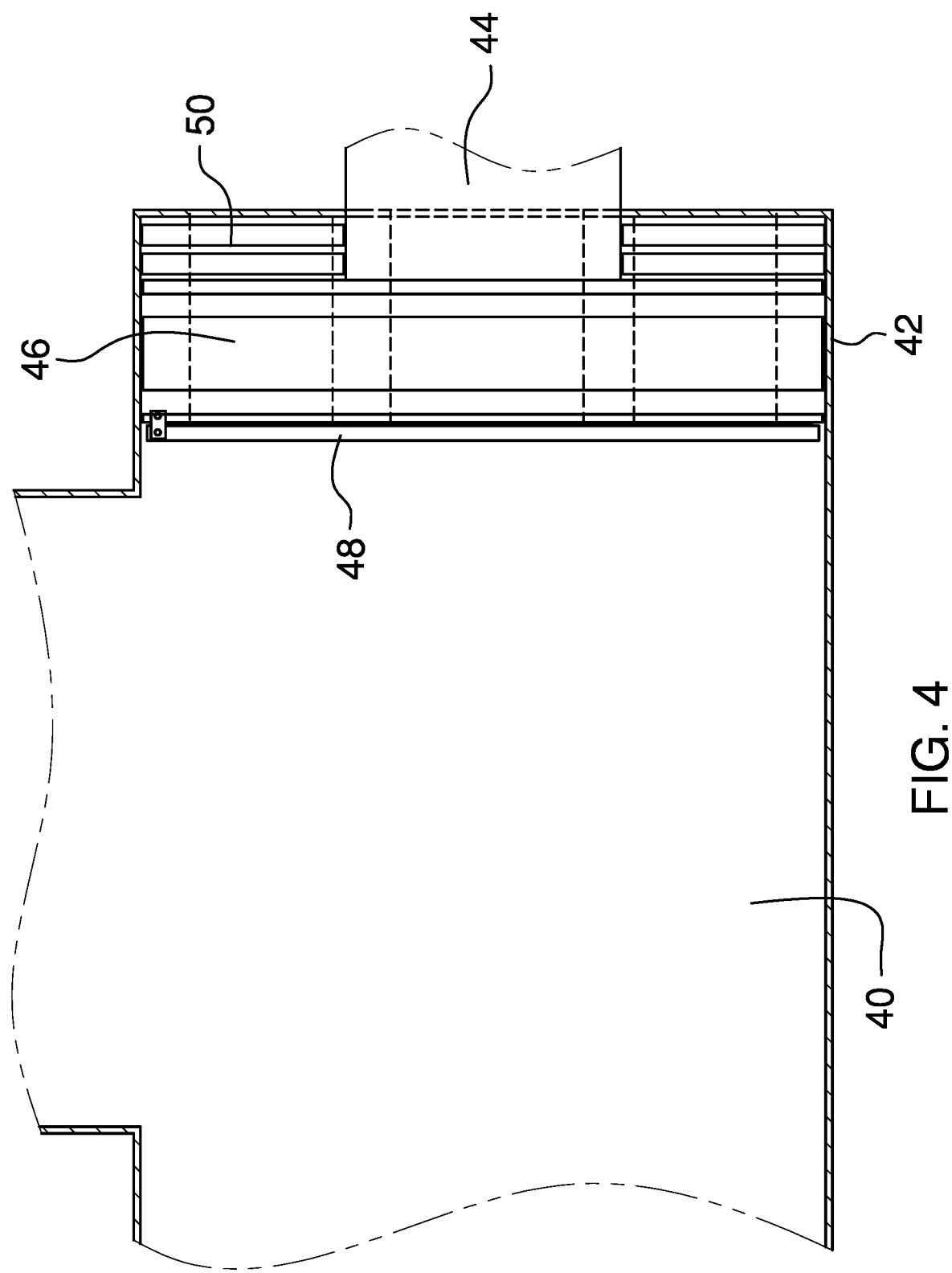
FIG. 4 is a detail view of an embodiment of the disclosure.
Figure 5:
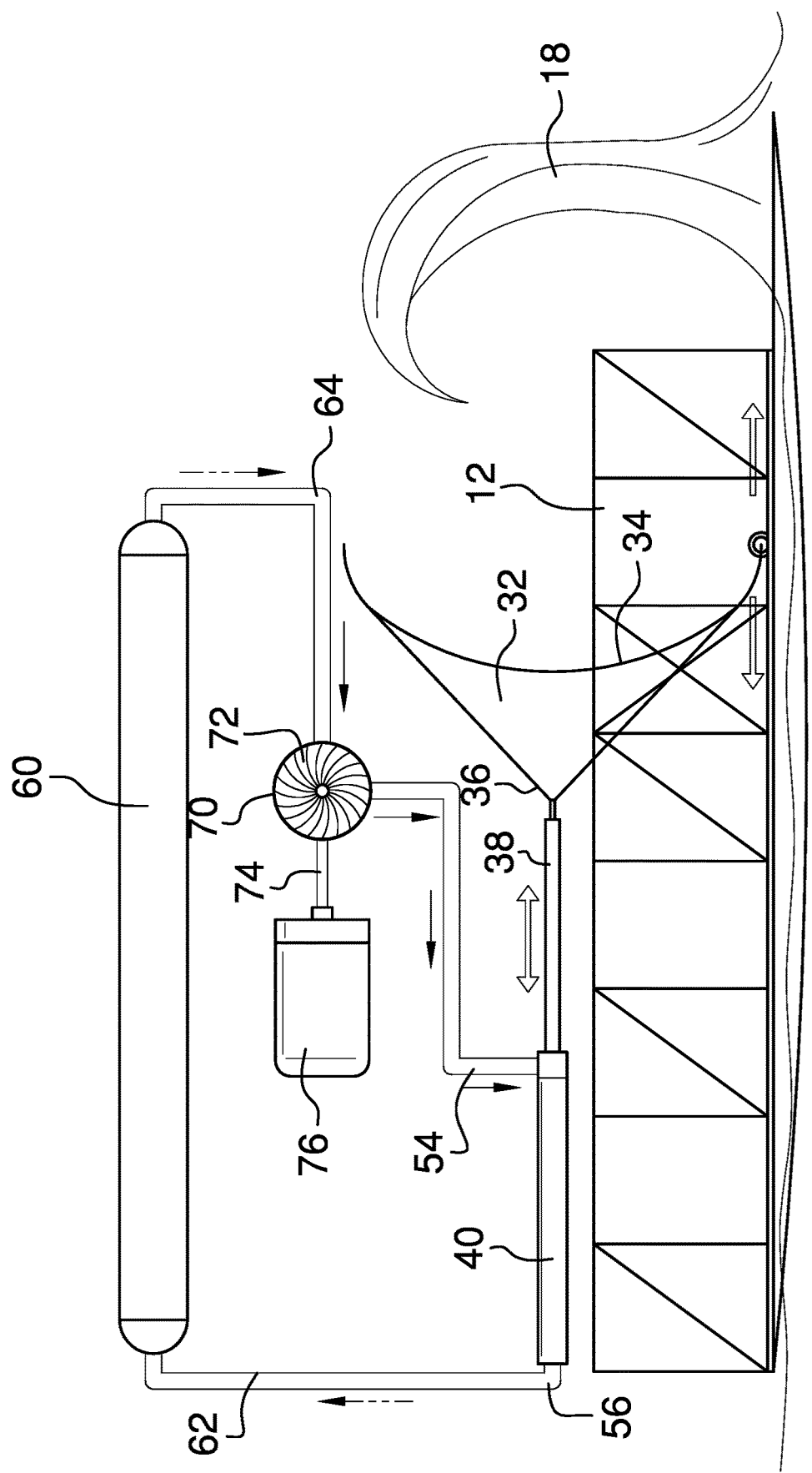
FIG. 5 is an alternative view of an embodiment of the disclosure.
Figure 6:
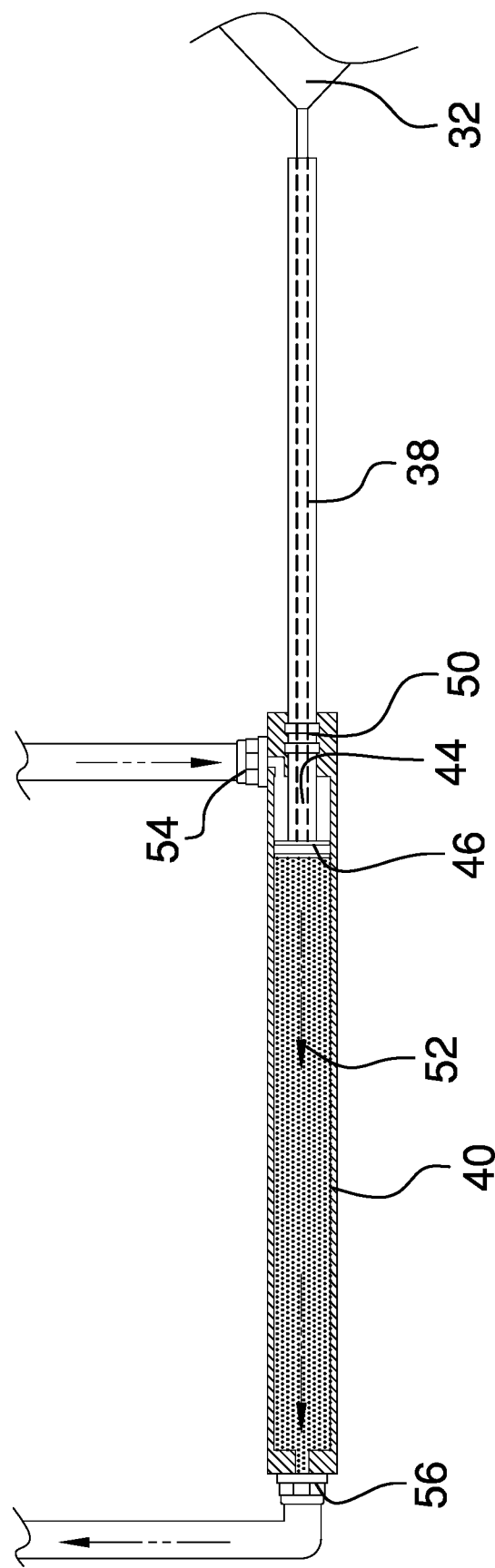
FIG. 6 is a cross-sectional view of an embodiment of the disclosure.
Figure 7:
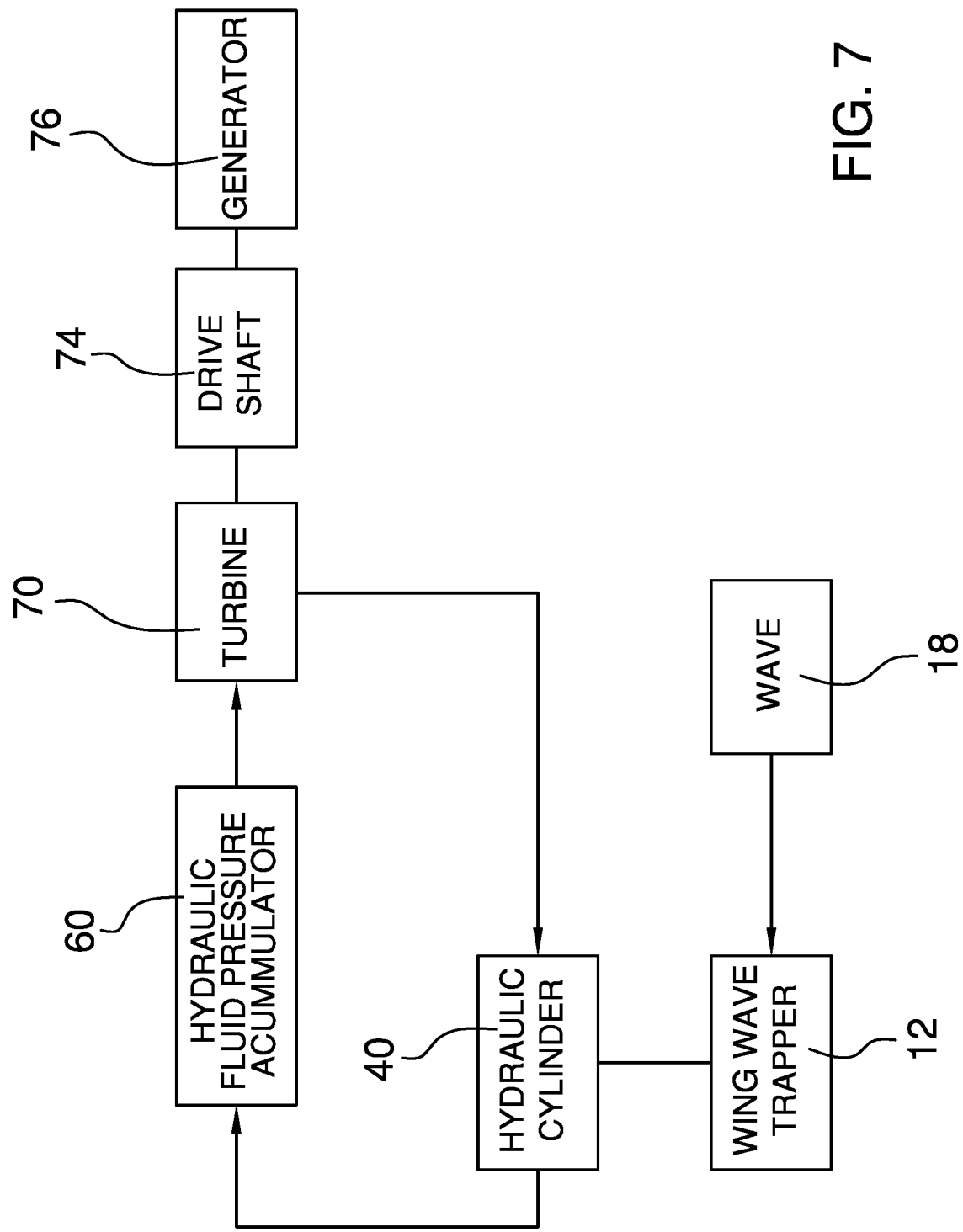
FIG. 7 is a box diagram view of an embodiment of the disclosure.
Figure 8:
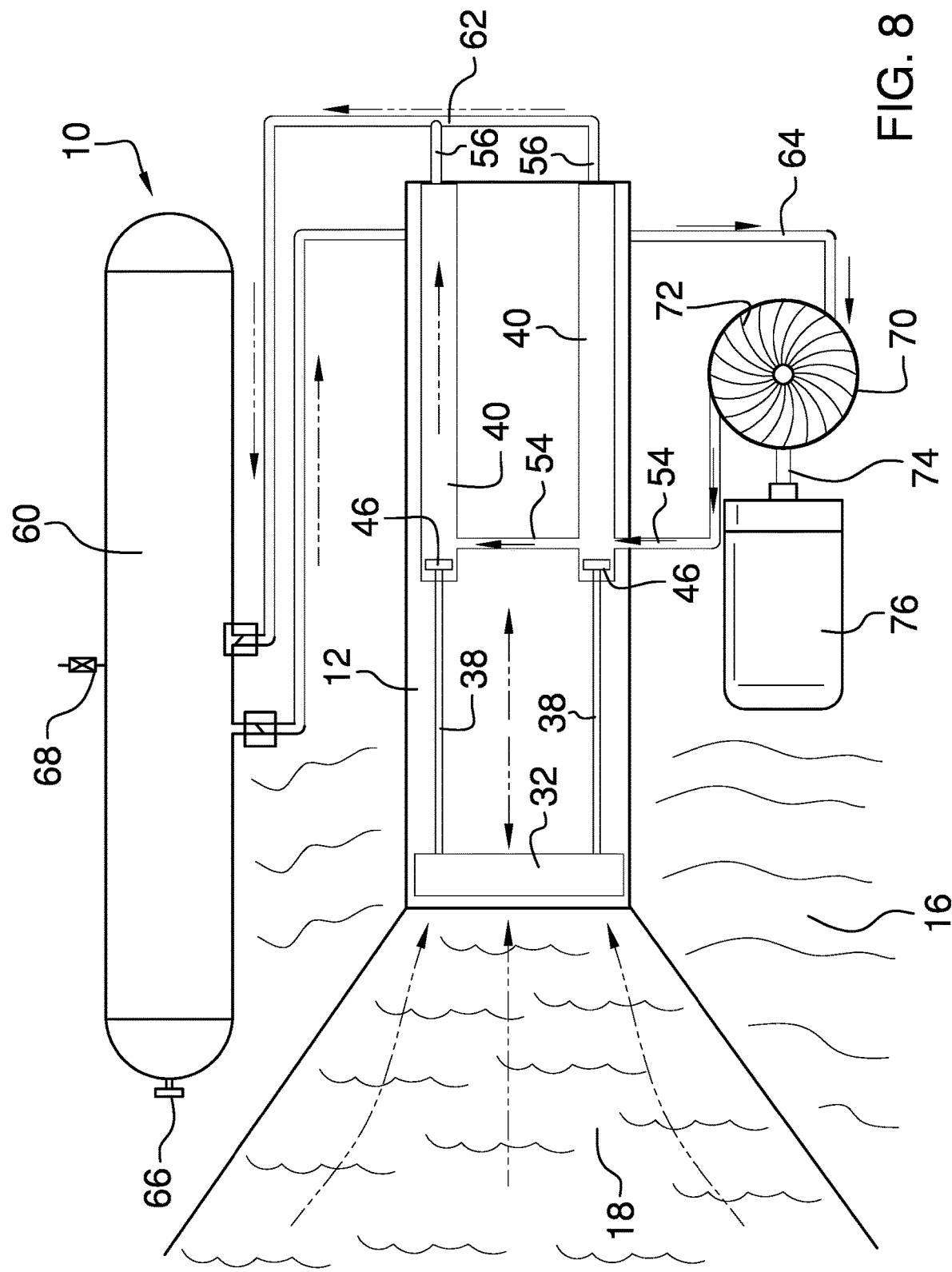
FIG. 8 is an alternative view of an embodiment of the disclosure.
Figure 9:
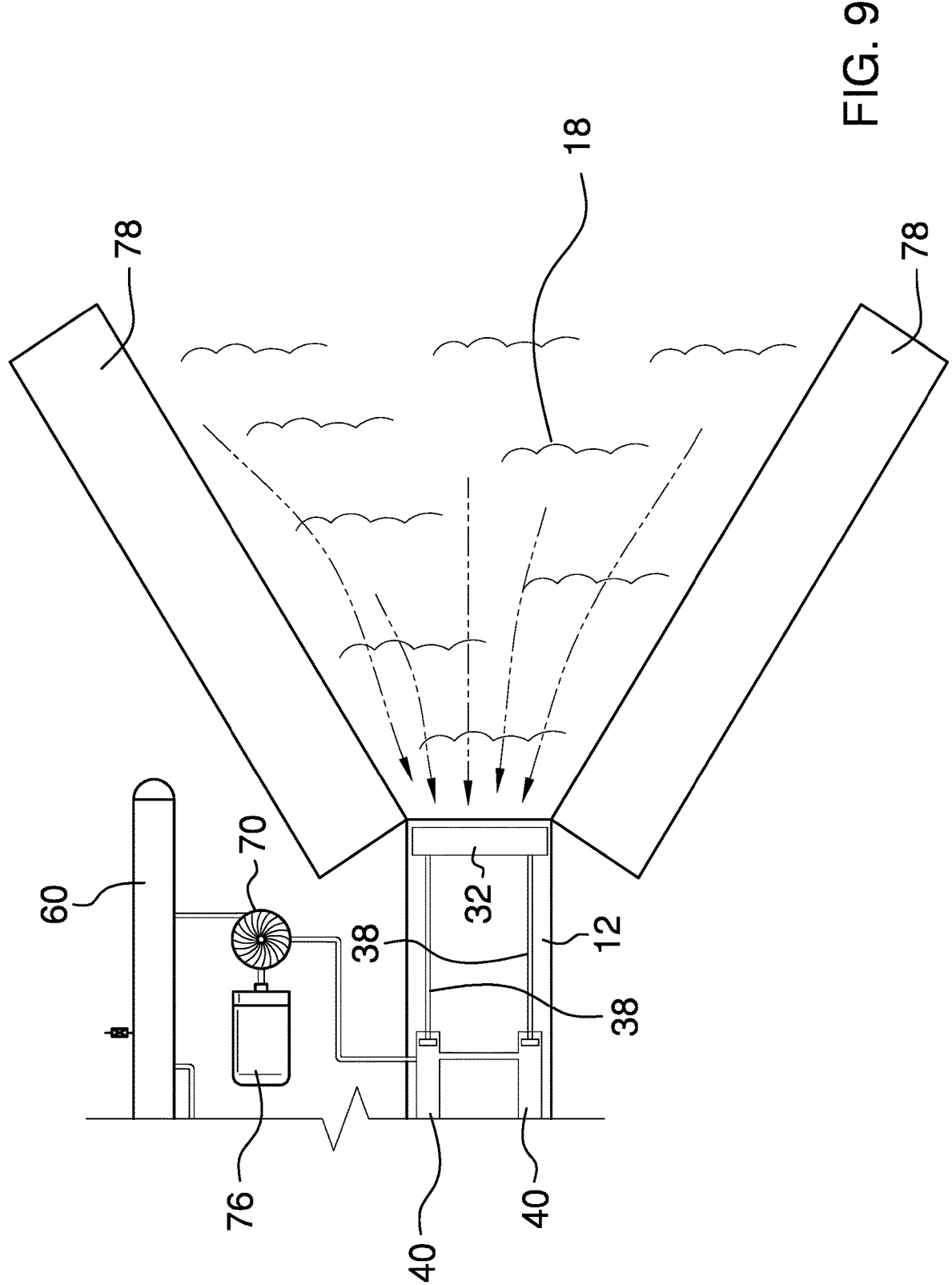
FIG. 9 is an alternative view of an embodiment of the disclosure.

With reference now to the drawings, and in particular to FIGS. 1 through 10 thereof, a new wave powered generator device embodying the principles and concepts of an embodiment of the disclosure and generally designated by the reference numeral 10 will be described.

As best illustrated in FIGS. 1 through 10, the wave powered hydraulic piston generator assembly 10 generally comprises a container 12. The container 12 is positioned adjacent to the shoreline 14 of a body of water 16. Furthermore, the container 12 is configured for being positioned at a downward angle relative to the body of water 16 to provide gravitational force upon the container 12. The body of water 16 is configured for producing a wave 18 wherein the wave 18 is configured for moving in a direction toward the shoreline 14 of the body of water 16. The container 12 has an opening 20 being configured for obtaining a wing 22 of the wave 18 from the body of water 16. The container 12 has an interior surface 24 and an exterior surface 26. A plurality of spikes 28 protrudes out from the exterior surface 26 of the container 12. Furthermore, the plurality of spikes 28 is configured for nesting into the ground 30 wherein retaining the container 12 in a fixed position.

A piston 32 is positioned against the interior surface 24 of the container 12. The piston 32 is a circular disc configured to move forward and backward within the container 12. The piston 32 has a front surface 34 and a back surface 36 wherein the front surface 34 of the piston 32 is configured for absorbing the wing 22 of the wave 18 from the body of water 16. A rod 38 protrudes out from the back surface 36 of the piston 32. A cylinder 40 is positioned within the container 12 and the rod 38 of the piston 32 is nested within a first end 42 of a cylinder 40. An end 44 of the rod 38 has a first seal 46 being configured for moving within the cylinder 40 and retaining the rod 38 within the cylinder 40. The first seal 46 is an orifice and has an internal swing valve 48. The internal swing valve 48 is configured for allowing a fluid to pass through the first seal 46 in a single direction. A second seal 50 is positioned on the first end 42 of the cylinder 40. The second seal 50 is configured for retaining a hydraulic fluid 52 within the cylinder 40. The cylinder 40 has an inlet 54 positioned proximate to the first end 42 of the cylinder 40. Alternately, an outlet 56 is positioned on a second end 58 of the cylinder 40.

Furthermore, a tank 60 is in fluid communication with the outlet 56 of the cylinder 40. The tank 60 is a hydraulic fluid pressure accumulator having a first conduit 62 and a second conduit 64. The first conduit 62 of the tank 60 is in fluid communication with the outlet 56 of the cylinder 40. Additionally, the tank 60 has a pressure gauge 66 being configured for monitoring the hydraulic fluid pressure within the tank 60. The tank 60 has a safety valve 68 being configured for releasing hydraulic fluid 52 from the tank 60 when the hydraulic fluid pressure exceeds a safety limit. The safety valve 68 prevents over accumulation of the hydraulic fluid 52 within the tank 60 wherein preventing damage to the assembly 10.

A turbine 70 is in fluid communication with the second conduit 64 of the tank 60. The turbine 70 is a hydraulic turbine configured for operating by the hydraulic fluid 52. The hydraulic fluid 52 enters the turbine to rotate an internal gear mechanism 72. The turbine 70 has a drive shaft 74 in mechanical communication with a generator 76. The drive shaft 74 of the turbine 70 is configured for mechanically engaging with the generator 76 wherein producing electric power from the generator 76. The turbine 70 is in fluid communication with the inlet 54 of the cylinder 40. The internal gear mechanism 72 of the turbine 70 flows the hydraulic fluid 52 into the inlet 54 of the cylinder 40 wherein the hydraulic fluid 52 passes through the internal swing valve 48 to pass into the outlet 56 of the cylinder 40.

A pair of barricades 78 is positioned adjacent to the container 12. Each of the barricades 78 has an interior 80 defining a place for a plurality of sand 82 to be stored within. The plurality of sand 82 is configured for providing weight to each of the barricades 78 wherein retaining each of the barricades in a fixed position relative to the ground 30. Each of the barricades 78 is configured for directing the wave 18 of the body of water 16 towards the opening 20 of the container 12.

In use, the user places the container 12 adjacent to the shoreline 14 of the body of water 16. The opening 20 of the container 12 faces the shoreline 14 and the plurality of spikes 28 of the container 12 is inserted into the ground 30 wherein retaining the container in place relative to the shoreline 14. The opening 20 of the container 12 absorbs the wing 22 of the wave 18 from the body of water 16. The assembly 10 further includes the step of retracting the piston 32 within the container 12 wherein thrusting the first seal 46 of the rod 38 of the piston 32 within a cylinder 40. The first seal 46 of the cylinder 40 creates the hydraulic fluid pressure within the cylinder 40 and flows the hydraulic fluid 52 to the tank 60. The assembly 10 forces the hydraulic fluid 52 out of the tank 60 into the turbine 70. The drive shaft 74 of the turbine 70 mechanically engages with the generator 76 wherein producing electric power. Subsequently, the turbine 70 returns the hydraulic fluid 52 to the cylinder 40. A gravitational weight of the piston 32 reinstates the piston 32 to an original position. The assembly 10 repeats the prior steps to accumulate an abundance of electrical power from the generator 76. The user removes the container 12 from the shoreline 14 when use is complete.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hydraulic piston generator assembly configured for generating electricity by the power of water waves against a piston, the hydraulic piston generator assembly comprising:
a container being positioned adjacent to the shoreline of a body of water, said container being configured for being positioned at a downward angle relative to said body of water, said body of water being configured for producing a wave, said container having an opening, said container having an interior surface and an exterior surface;
a piston being positioned against said interior surface of said container, said piston having a front surface and a back surface, a rod protruding out from said back surface of said piston;
a cylinder being positioned within said container, an end of said rod having a first seal, said first seal being configured for moving within said cylinder and retaining said rod within said cylinder, said cylinder having an inlet positioned proximate to said first end of said cylinder, an outlet being positioned on a second end of said cylinder;
a tank being in fluid communication with said outlet of said cylinder, said tank having a first conduit and a second conduit, said first conduit of said tank being in fluid communication with said outlet of said cylinder;
a turbine being in fluid communication with said second conduit of said tank, said turbine having a drive shaft being in mechanical communication with a generator, said turbine being in fluid communication with said inlet of said cylinder; and
a pair of barricades being positioned adjacent to said container, each of said barricades being configured for directing the wave of the body of water towards said opening of said container.

2. The hydraulic piston generator assembly of claim 1, further comprising said wave being configured for moving in a direction toward the shoreline of the body of water.

3. The hydraulic piston generator assembly of claim 2, further comprising said opening of said container being configured for obtaining a wing of the wave from the body of water.

4. The hydraulic piston generator assembly of claim 1, further comprising a plurality of spikes protruding out from said exterior surface of said container, said plurality of spikes being configured for nesting into the ground wherein retaining the container in a fixed position.

5. The hydraulic piston generator assembly of claim 3 further comprising said piston being circular disc configured to move within said container.

6. The hydraulic piston generator assembly of claim 5 further comprising said front surface of said piston being configured for absorbing the wing of the wave from the body of water.

7. The hydraulic piston generator assembly of claim 6, further comprising said rod of said piston being nested within a first end of a cylinder.

8. The hydraulic piston generator assembly of claim 7, further comprising said first seal being an orifice having an internal swing valve, a second seal being positioned on said first end of said cylinder, said second seal being configured for retaining a hydraulic fluid within said cylinder.

9. The hydraulic piston generator assembly of claim 8, further comprising said tank being a hydraulic fluid pressure accumulator.

10. The hydraulic piston generator assembly of claim 9, further comprising said first conduit of said tank being in fluid communication with said outlet of said cylinder, said tank having a pressure gauge, said pressure gauge of said tank being configured for monitoring the hydraulic fluid pressure within said tank, said tank having a safety valve, said safety valve of said tank being configured for releasing hydraulic fluid from said tank when the hydraulic fluid pressure exceeds a safety limit.

11. The hydraulic piston generator assembly of claim 10, further comprising said turbine being a hydraulic turbine configured for operating by a hydraulic fluid.

12. The hydraulic piston generator assembly of claim 11, further comprising said drive shaft of said turbine being configured for mechanically engaging with said generator wherein producing electric power from said generator.

13. The hydraulic piston generator assembly of claim 12, further comprising each of said barricades having an interior defining a place for a plurality of sand to be stored within, said plurality of sand being configured for providing weight to each of said barricades wherein retaining each of said barricades in a fixed position.

14. A hydraulic piston generator assembly configured for generating electricity by the power of water waves against a piston, the hydraulic piston generator assembly comprising:
a container being positioned adjacent to the shoreline of a body of water, said container being configured for being positioned at a downward angle relative to said body of water, said body of water being configured for producing a wave, said wave being configured for moving in a direction toward the shoreline of the body of water, said container having an opening, said opening of said container being configured for obtaining a wing of the wave from the body of water, said container having an interior surface and an exterior surface, a plurality of spikes protruding out from said exterior surface of said container, said plurality of spikes being configured for nesting into the ground wherein retaining the container in a fixed position;
a piston being positioned against said interior surface of said container, said piston being circular disc configured to move within said container, said piston having a front surface and a back surface, said front surface of said piston being configured for absorbing the wing of the wave from the body of water, a rod protruding out from said back surface of said piston;
a cylinder being positioned within said container, said rod of said piston being nested within a first end of a cylinder, an end of said rod having a first seal, said first seal being configured for moving within said cylinder and retaining said rod within said cylinder, said first seal being an orifice having an internal swing valve, a second seal being positioned on said first end of said cylinder, said second seal being configured for retaining a hydraulic fluid within said cylinder, said cylinder having an inlet positioned proximate to said first end of said cylinder, an outlet being positioned on a second end of said cylinder, said first seal of said rod of said piston being positioned from said inlet to said outlet of said cylinder;
a tank being in fluid communication with said outlet of said cylinder, said tank being a hydraulic fluid pressure accumulator, said tank having a first conduit and a second conduit, said first conduit of said tank being in fluid communication with said outlet of said cylinder, said tank having a pressure gauge, said pressure gauge of said tank being configured for monitoring the hydraulic fluid pressure within said tank, said tank having a safety valve, said safety valve of said tank being configured for releasing hydraulic fluid from said tank when the hydraulic fluid pressure exceeds a safety limit;

a turbine being in fluid communication with said second conduit of said tank, said turbine being a hydraulic turbine configured for operating by the hydraulic fluid, said turbine having a drive shaft being in mechanical communication with a generator, said drive shaft of said turbine being configured for mechanically engaging with said generator wherein producing electric power from said generator, said turbine being in fluid communication with said inlet of said cylinder; and a pair of barricades being positioned adjacent to said container, each of said barricades having an interior defining a place for a plurality of sand to be stored within, said plurality of sand being configured for providing weight to each of said barricades wherein retaining each of said barricades in a fixed position, each of said barricades being configured for directing the wave of the body of water towards said opening of said container.

15. A method for generating power from a hydraulic piston assembly, the method including the step of:

placing a container adjacent to the shoreline of a body of water, an opening of said container facing the shoreline, a plurality of spikes of said container being inserted into the ground wherein retaining said container in place relative to said shoreline;

absorbing a wing of a wave from the body of water within said opening of said container, said assembly further including the step of:

retracting a piston within said container wherein thrusting a first seal of a rod of said piston within a cylinder; said first seal of said cylinder creating a hydraulic fluid pressure within said cylinder;

flowing the hydraulic fluid to a tank, said tank being configured for storing the hydraulic fluid;

forcing the hydraulic fluid out for said tank into a turbine, said turbine having a drive shaft engaging with a generator, said generator producing electric power; and said turbine returning the hydraulic fluid to said cylinder, a gravitational weight of said piston reinstating said piston to an original position;

repeating the prior step to accumulate an abundance of electrical power from said generator; and removing said container from the shoreline when use is complete.

\* \* \* \* \*